Figure 1:
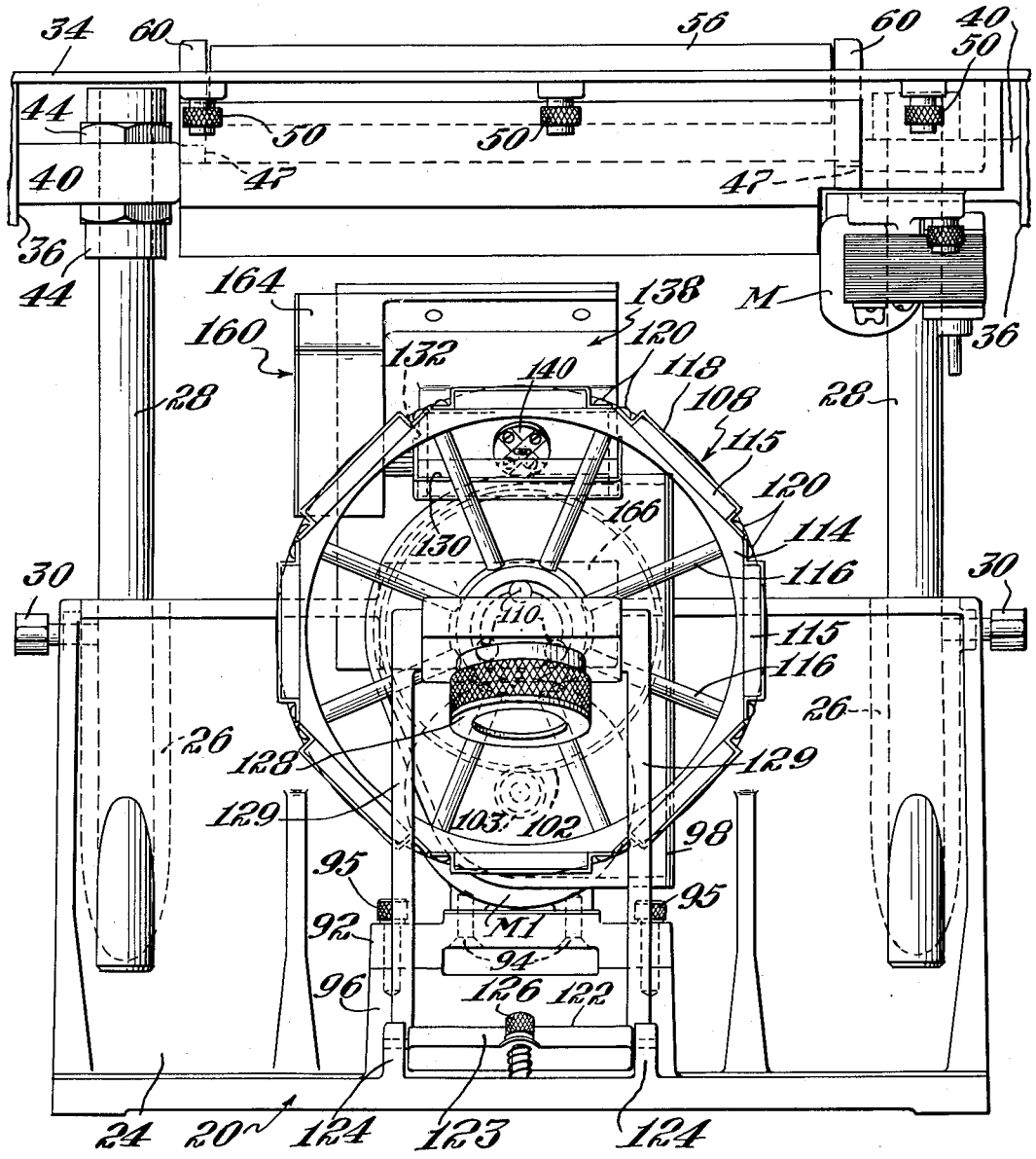

June 12, 1956  A. NYMAN  2,750,443
MIRROR DRUM FACSIMILE SCANNER
Filed June 18, 1951  5 Sheets-Sheet 1

Inventor
Alexander Nyman
by Roberts, Cushman & Grover
att'ys.

June 12, 1956 A. NYMAN 2,750,443
MIRROR DRUM FACSIMILE SCANNER
Filed June 18, 1951 5 Sheets-Sheet 3
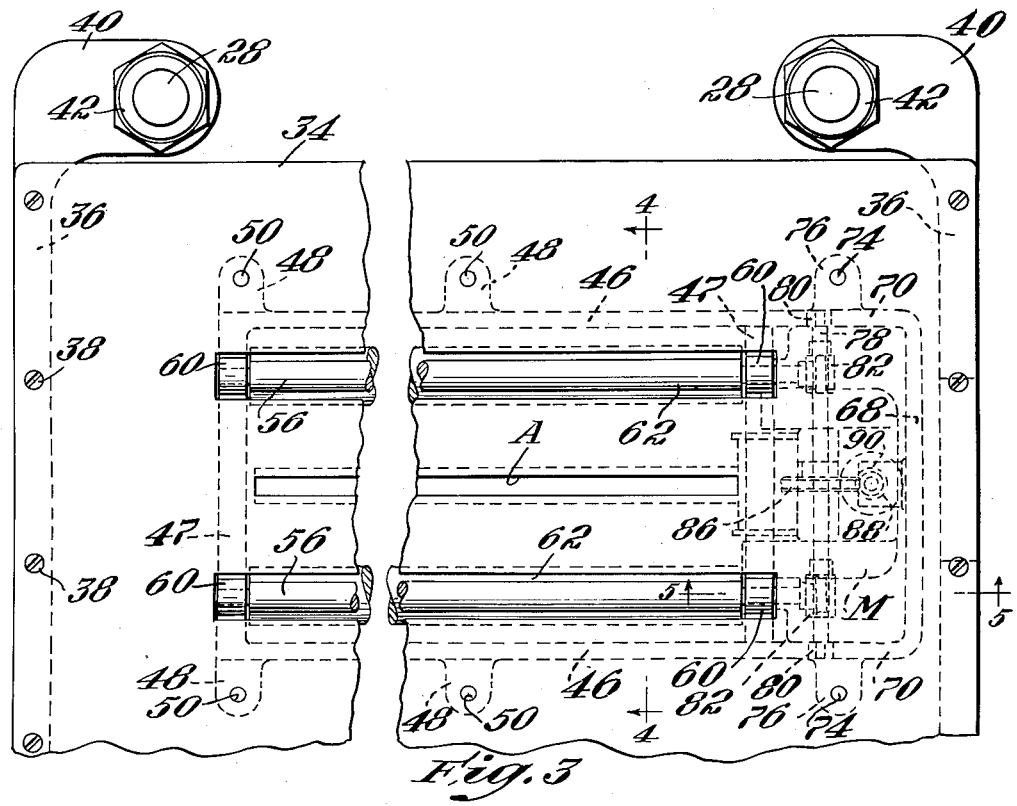
Fig. 3
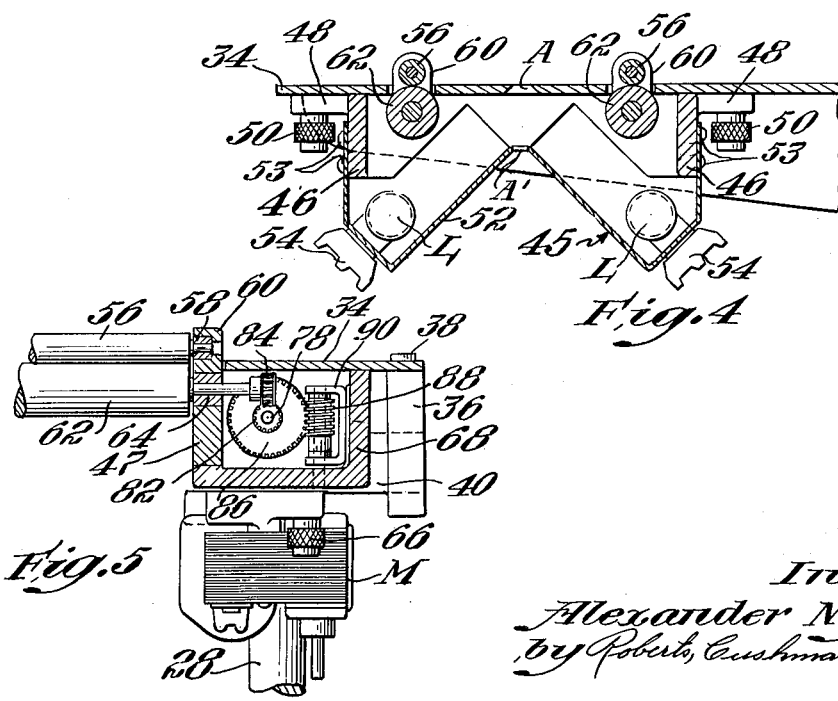
Fig. 4
Fig. 5
Inventor
Alexander Nyman
by Roberts, Cushman & Grover
att'ys.

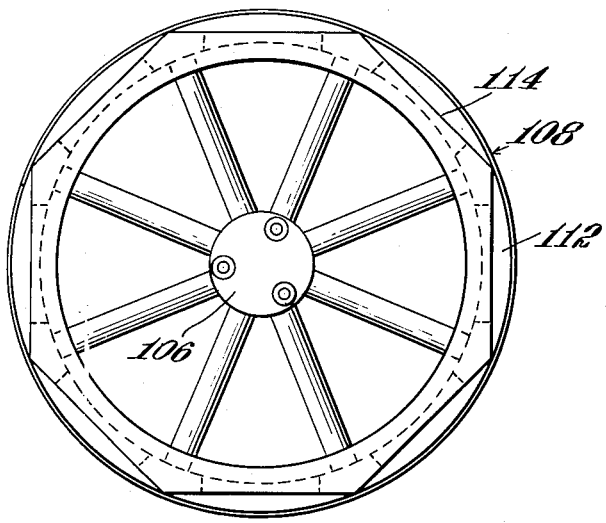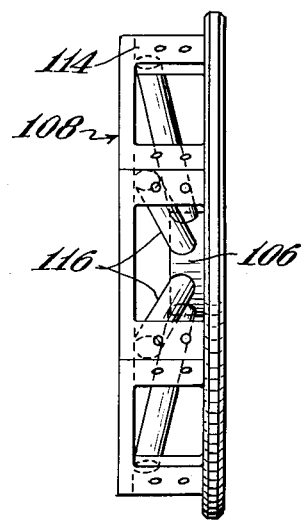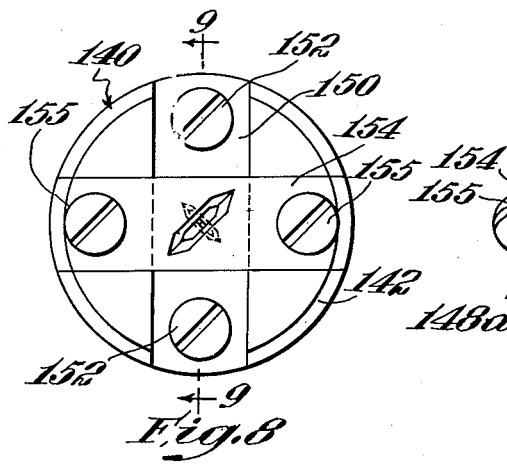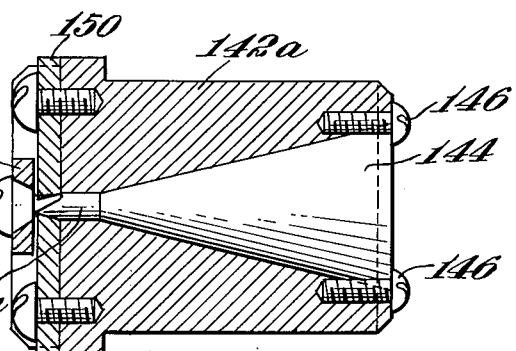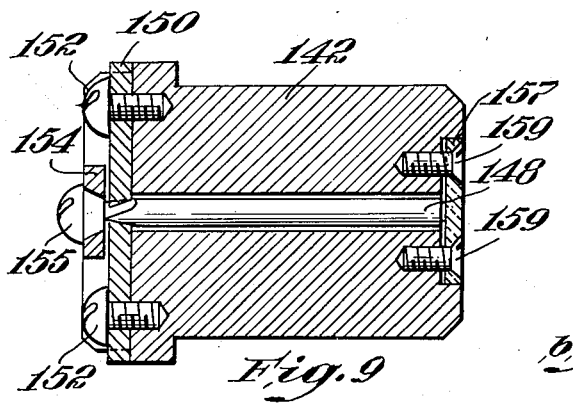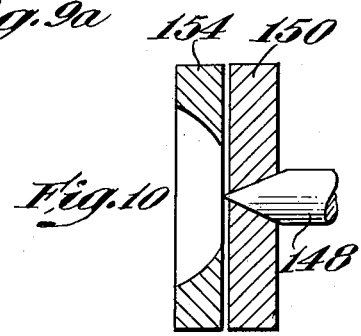
Inventor
Alexander Nyman
by Roberts, Cushman & Grover
att'ys.

United States Patent Office 2,750,443
Patented June 12, 1956

2,750,443
MIRROR DRUM FACSIMILE SCANNER

Alexander Nyman, Dover, Mass., assignor to Alden Products Co., Brockton, Mass., a corporation of Massachusetts Application June 18, 1951, Serial No. 232,221

3 Claims. (Cl. 178—7.1)

In conventional optical scanning apparatus, such as transmitters commonly used for facsimile and copy work, the subject copy is secured to the periphery of a rotating drum and scanned by a photoelectric cell which is moved axially relatively to the drum. This arrangement is very satisfactory for many applications but is subject to several inherent disadvantages including the necessity of stopping the drum to change the copy so that the transmission cannot be continuous. Furthermore the copy must be able to conform to the surface of the drum thus making it impractical to scan nonflexible material such as bound books.

Objects of this invention are to provide an optical scanner which will scan flat copy, which does not require that the copy be deformed, which is continuous in operation, which does not require relative movement of the photocell transversely of the direction of feed of the copy, which is not limited as to the length of copy scanned, and which advances the facsimile art generally.

In a broad aspect the invention contemplates optical apparatus for scanning a subject copy comprising means for rotating one or more reflectors such as prisms or mirrors about an axis with their reflecting surfaces disposed at equal distances from their axis of rotation. Means are provided for feeding the subject copy relatively to a predetermined path so that the light rays coming either by transmission through or reflection from selected elements of the copy are impinged by means of an optical system upon the reflecting surfaces in sequence during a portion of their rotation about the axis, the optical system also being arranged to image successively the selected copy elements, whose dimensions are determined for example, by an optical aperture upon a photoelectric cell or other light sensitive device which is responsive to variations in light intensity.

In a more specific aspect the path along which the copy is fed is determined by one side of a guide or a copy table having an aperture therein in the form of a slot or elongated aperture transverse to the direction in which the copy is fed, one or more feed rolls being provided preferably upon either side of the slot. Light rays from a light source positioned upon the opposite side of the table or guide are reflected from consecutive elements or portions of the copy material as it is moved by the slot.

In another aspect the optical aperture is positioned between the photoelectric cell or other light sensitive device and the reflecting surface to limit the size of the image directed upon the cell so that an elemental width and length of the copy is scanned by successive reflecting surfaces. To minimize defocusing such aperture is located so that the ratio of the optical distance between the effective reflecting surface and the aperture to the distance between the aperture and the axis of rotation of the reflecting surfaces is made substantially equal to the cosine of one half the maximum scanning angle.

In another aspect the reflecting surfaces are mirrors or prisms carried upon a spider with their reflecting surfaces directed inwardly so that a stationary converging lens system incorporated in the optical system causes the light rays coming from consecutive portions of the copy to be reflected upon successive spider mirrors. The effective reflecting surface is preferably positioned upon the opposite side of the axis of rotation of the spider so that the optical path can be folded into a more compact space.

Figure 2:
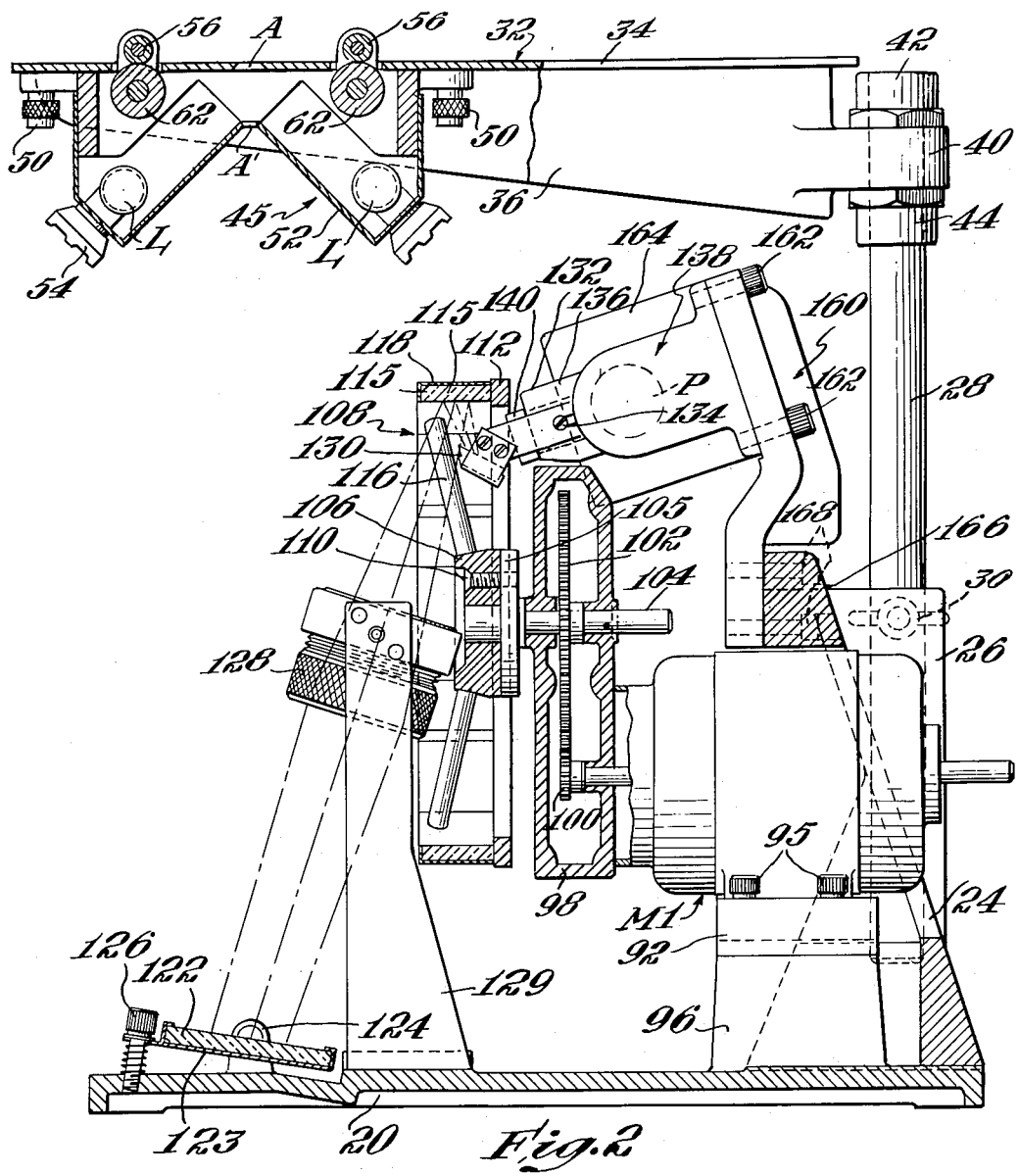
Figure 11:
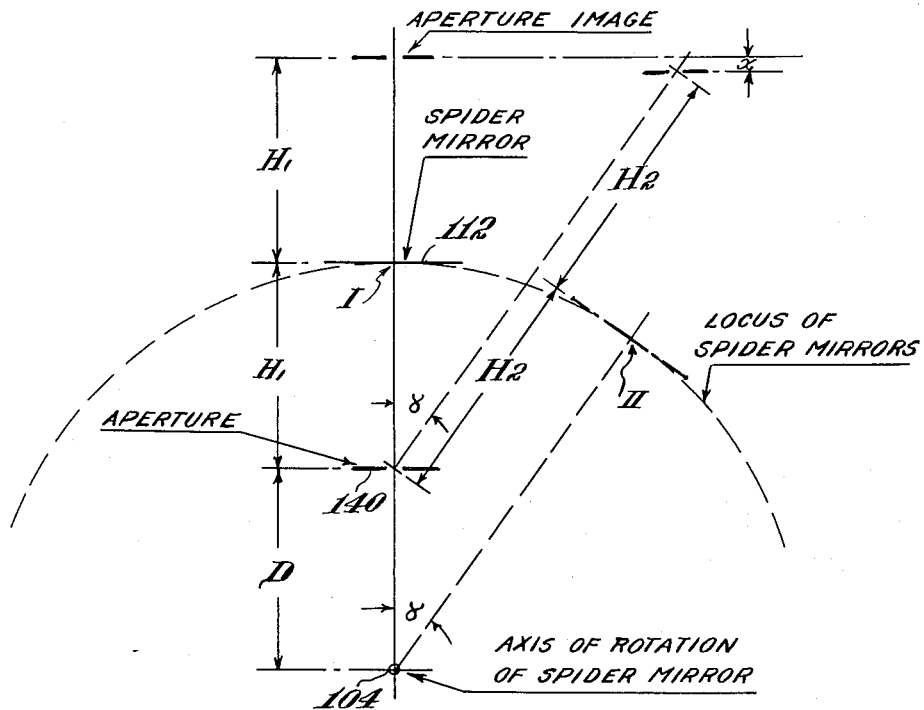

Further objects relate to various features of construction and will be apparent from a consideration of the following description and accompanying drawings wherein:

Fig. 1 is a front elevation view of a facsimile scanner;
Fig. 2 is a side elevation view of the scanner shown in Fig. 1;
Fig. 3 is a partial plan view of the copy table;
Fig. 4 is a partial section on lines 4—4 of Fig. 3;
Fig. 5 is a partial sectional view on lines 5—5 of Fig. 3;
Fig. 6 is a front elevation view on the spider and mirror assembly;
Fig. 7 is a side elevation view of the spider and mirror assembly;
Fig. 8 is a front elevation view of one construction of the aperture assembly;
Fig. 9 is a sectional view on lines 9—9 of Fig. 8;
Fig. 9a is a sectional view similar to Fig. 9 of an alternate construction of aperture assembly;
Fig. 10 is an enlarged partial sectional view showing the details of the aperture plates; and
Fig. 11 is a schematic diagram illustrating the principle of operation of the scanner.

As is best shown in Figs. 1 and 2 the embodiment of an optical scanner chosen for the purposes of illustration is supported upon a base 20 having a bracket 24 cast integrally therewith so that the bracket extends upwardly from the rear of the base. The bracket 24 has bosses 26 positioned at either end thereof wherein are carried respectively two vertically disposed columns 28 which telescope respectively in apertures in the bosses being secured in adjusted position by means of thumb screws 30.

Upon the upper ends of the columns 28 is carried a copy table 32, which has an upper copy guiding surface 34, each side of which is reinforced by a respective rib 36 being attached thereto by means of screws 38. At the rear end of each rib 36 is an integrally cast finger or tab 40 which is turned inwardly and provided with an aperture for engaging the upper end of a respective column 28. The table 32 is held in position by two pairs of nuts 42 and 44 which engage threads cut in the ends of the columns 28 so that nuts are positioned respectively above and below the tabs 40.

As is shown in Figs. 3 and 4, the surface 34 of the copy table 32 is provided with three transverse slots. The center slot A, which forms an elongated optical aperture whose function will be described in detail below, is brightly illuminated from the bottom of the table by means of two tubular electric lamps L which are preferably of the fluorescent type. The lamps L are enclosed in a lamp housing 45 which is suspended beneath the table 32. The housing 45 consists of a substantially rectangular frame having two opposed side members 46 which are provided with a plurality of apertured tabs 48. Connecting members 47 extend between the ends of the side members 46 to complete the frame. A plurality of knurled headed screws 50 engage the corresponding tab apertures and thread into the bottom of the table so that the housing 45 is secured to the table 32. A sheet metal enclosure 52, which is shaped like an inverted V as is best shown in Fig. 4, is attached to the frame side members 46 by screws 53. Suitable electrical elements of conventional design such as the sockets and connectors designated generally by the numeral 54 are located at the lower end of each of the legs of the housing to accommodate the respective lamps L. A slotted aperture A' is positioned at the apex of the enclosed legs where it is in vertical alignment with the table aperture A.

The lamp housing 45 also supports two pair of copy feed rolls which are located in the outer slots in the table on either side of the aperture A. The upper driven roll 56 is carried upon a shaft which is journaled in bearings 58 as is shown in Fig. 5. Each bearing 58 is pressed into an aperture in a respective boss 60 which projects upwardly through the slotted apertures in the table from the connecting members 47 of the lamp housing 45. The shaft of the lower driving roll 62 is journaled in bearings 64 pressed in apertures in the opposed connecting members 47 immediately below the bosses 60.

Both pairs of feed rolls are driven at the same speed by means of an electric motor M which is suspended from the bottom of the housing 68 of a reduction gear unit by means of the knurled screws 66. The gear reduction unit comprises a shaft 78 whose ends are journaled in bearings 80 (Fig. 3) pressed in the housing ends 70. The shaft 78 carries two worms 82 which engage gears 84 carried on the ends of the respective shafts of the lower feed rolls 62. Interposed between the worms 82 is a driving gear 86 which mates with a worm gear 88 carried upon the shaft of the motor M between the arms of a V-shaped bracket 90 secured to the side wall of the gear reduction unit housing 68.

As is best shown in Figs. 1 and 2 the base of a second motor M1 is attached to a spacer 92 by flat headed screws 94. The spacer 92 is in turn fastened by screws 95 to a boss 96 cast integrally with the base 20. The end bell of the motor M1 has fastened thereto a housing 98 for a reduction gear unit which includes a pinion 100 secured to the end of the motor shaft. The pinion 100 mates with a gear 102 carried upon a shaft 104 journaled in the walls of the housing 98. The end of the shaft 104 extends through the front housing wall and carries a disc 105 which is secured to the hub 106 of a spider 108 by means of three screws 110.

As is shown in Figs. 6 and 7, the spider 108 consists of a structure which may be either cast or fabricated in the form of an octagonal rim 114 having a flange 112. Eight equally spaced integral spokes 116 cant outwardly from the hub 106 to the respective junctions between adjacent flat portions of the octagonal rim 114. A plurality of mirrors 115 (Fig. 1) are carried upon the respective flat portions of the rim portion 114 being secured thereto with their reflecting surfaces directed inwardly by associated brackets 118 which are attached to the spider 108 by means of screws 120.

A stationary mirror 122 is pivotally mounted upon the base 20 directly below the aligned apertures A and A'. The mirror 122 is secured in a bracket 123 journaled in two bosses 124 extending upwardly from the base 20 so that it can be adjusted by means of a spring biased adjusting screw 126 to impinge light rays coming from the subject copy adjacent the table aperture A upon the particular spider mirror 115 which is positioned in the top portion of its travel about the axis of the shaft 104. A conventional converging lens system is mounted in the optical barrel 128 which is supported between two spaced brackets 129 extending upwardly from the front portion of the base 20 so that the lens system is interposed in the optical path between the stationary mirror 122 and the top spider mirror 115.

A second stationary mirror 130 (Fig. 2) is supported by means of a bracket 132 within the rim 114 of the spider 108 directly beneath the position occupied by the top spider mirror 115. The ends of the bracket 32 are provided with slots through which pass screws 134 engaging threaded apertures in the sides of a boss 136 extending from a phototube housing 138 whereby the position of the mirror can be adjusted with respect to the surfaces of the spider mirrors 115.

A light sensitive device such as the photocell P is mounted in a horizontal position within the hollow lighttight housing 138. Light rays reflected from the mirror 130 are admitted into the housing 138 through an aperture 140 secured in the boss 132. The structural details of one form of the aperture assembly can best be seen in Figs. 8 through 10 wherein the numeral 142 designated as a flanged cylindrical member or barrel having an axially disposed passage or aperture extending therethrough. A rod 148 of a material, such as sapphire, having a high index of refraction is inserted in the passage. One end of the rod 148 is ground in the shape of a wedge having an included angle of approximately 40° as is shown is Fig. 10. The wedge shaped end of the rod 148 extends beyond the end of the barrel 142 through a V-shaped slot milled or otherwise cut in a strap 150 at an angle of 45° to the longitudinal axis of the strap as is shown in Fig. 8. The strap 150 is recessed in a slot in the flanged end of the barrel 142 being secured therein by means of screws 152 which engage threaded apertures in the flange. A second similarly slotted strap 154 is fastened to the flanged end of the barrel 142 by screws 155 so that the slot therein lies adjacent and at an angle of 90° to the slot in the recessed strap 150. The depth of the slot in the end of the barrel 142 is made slightly greater than the thickness of the strap 150 so that a clearance is provided between the straps 150 and 154 into which clearance the apex of the wedge end of the rod 148 extends as is shown in Fig. 10. The rod 148 is held in position by means of a transparent plate 157 which is secured in a recess in the end of the barrel 142 by means of screws 159.

As is best shown in Fig. 8 the edge of the wedge end of the rod 148 is arranged parallel with the axis of the slot in the bottommost strap 150 so that light rays normal to the edge impinge upon the wedge over a great angle of incidence approaching 120° without appreciable loss of aperture area. The effective dimensions of the aperture are determined by the width of the slots in the straps 150 and 154.

A modification of the aperture assembly is shown in Fig. 9a wherein the grooved straps 150 and 154 and the wedge shaped end of the sapphire rod are similar in construction to those described in detail heretofore. The rod 148a is foreshortened and abuts the small end of a truncated cone 144 of a light transmitting material such as "Lucite" which is secured in a tapered aperture in the barrel 142a by means of screws 146.

The aperture barrel 142 is mounted in the boss 136 with the axis of the groove in the outside strap 154 perpendicular to the optical axis of lens 128 and parallel to the reflecting surface of the top spider mirror 115 in its median position so that the wedge at the end of the rod 148 will receive incident light through a very wide angle on either side of the aperture axis.

The housing 138 for the photocell P is secured to the face of a bracket 160 (Fig. 2) by means of screws 162. The bracket 160 is in turn attached to the horizontal boss 166 on the top of the rear base bracket 24 by means of screws 168. The end of the housing 138 is provided with a flange to which is fastened a side plate 164 (Fig. 1). The side plate 164 has mounted on its inner surface a conventional socket (not shown) so that the photocell P is readily taken from the housing 138 by removing the plate.

The copy is placed upon the top of the table 32 and manually inserted between the two pair of feed rolls 56 and 62 with the surface to be scanned towards the table surface 34. The energization of the motor M drives both pair of feed rolls, as described heretofore, so that the subject copy moves by the aperture slot A in the table surface 34. Light rays from the lamps L are reflected from the portion of the copy adjacent the aperture A, down through the opening A', in the lamp enclosure 45 to impinge upon the stationary mirror 122. The rays are then reflected from the mirror 122 through the converging lens system in the barrel 128 to impinge upon the mirror 115 which is positioned at the top of the path of travel and thence to the stationary mirror 130 which directs the rays through the aperture 140 to impinge on the light sensitive electrode of the photocell P.

It will be evident that as the spider 108 is rotated by the motor M1, the band or strip of light reflected from the copy adjacent the aperture A as described above, moves across the wedge at the end of the sapphire rod 148 of the aperture 140 i. e. the photocell P in effect "sees" successive elemental areas of the copy. By correlating the rate of advance of the copy with the rotational speed of the spider 108, each spider successive mirror 115 reflects light rays from sequential transverse elements of the copy so that the photocell P receives light from successive areas of sequential transverse elements of the subject copy i. e. the copy is scanned by the photocell.

A schematic diagram is shown in Fig. 11 wherein for clarity and simplicity the stationary mirrors 122 and 130 and the spider mirrors other than the one of immediate concern have been omitted. In the diagram the aperture and the spider mirror bear the designations 140 and 112 respectively as employed previously heretofore. With the mirror 112 in the uppermost position designated I, the image of the aperture 140, appears to be at a distance behind the mirror surface equal to H1 i. e. the distance between the mirror surface and the aperture. The distance between the aperture 140 and the axis of rotation of the mirror spider about the shaft 104 is designated D. If there is a stationary mirror between the rotating mirror and the axis (such as 130 in Figs. 1 and 2) D is the distance between the axis and the virtual image of the aperture behind the stationary mirror, and if there is no such stationary mirror D is the actual distance as in Fig. 11. It will be evident that $H1+D$ is equal to the radius of rotation of the spider mirrors.

If the mirror 112 is rotated clockwise through an angle to a position designated II, the aperture image is also moved through the same angle $\gamma$ to a position which appears to be a distance behind the mirror surface equal to H2 i. e. the distance from the aperture 140 to the mirror surface. During such rotation the aperture image deviates from a straight line by a distance designated $x$ i. e. the effective location of the aperture changes with the rotation of the mirror 112 so that the light rays coming from the copy through the lens system 128 cannot be maintained in focus upon the aperture.

From the geometry of the diagram it will be evident that the following relation holds for any value of $\gamma$:

$$x = 2D(1 - \cos \gamma)(H/D - \cos \gamma)$$

Further it can be shown both experimentally and mathematically that for any given maximum value $\gamma$ of the angle of rotation of the spider mirror, by making the ratio $H/D$ equal to cosine of $\gamma$ the deviation $x$ is minimized so that the defocusing can be kept within reasonable limits without the necessity of using special and expensive lens systems.

It should be understood that the present dsclosure is for the purpose of illustration only and that this invention includes all modifications and equivalents which fall within the scope of the appended claims.

I claim:
1. Apparatus for scanning a subject copy comprising means for guiding the copy along a predetermined path, a light sensitive device, an optical system for focusing light from the copy on the device along a light path, a rotor associated with said light path, a series of mirrors uniformly distributed about the axis of the rotor to cross said light path successively, the mirrors being positioned to scan the same transverse line of the copy when the copy is stationary, means for advancing the copy along said path in synchronism with said rotor so that successive mirrors scan successive juxtaposed transverse lines of the copy, and means having an aperture in front of said device in said light path, the parts being disposed so that the ratio of the minimum distance between the mirrors and the aperture to the distance between the aperture and the axis is substantially equal to the cosine of one-half the maximum scanning angle.

2. Optical scanning apparatus for a subject copy comprising a light sensitive device responsive to variations in light intensity, a mirror disposed at a distance from an axis of rotation, means for rotating the mirror about the axis, an optical system including a lens for causing light rays coming from the copy to impinge upon the mirror during a portion of its rotation about the axis, said optical system being arranged to image successively the consecutive elements of the copy upon the device, and means having an aperture for limiting the size of said elements, the parts being disposed so that the ratio of the minimum distance between the mirror and the aperture to the distance between the aperture and the axis of rotation is substantially equal to the cosine of one-half the maximum scanning angle.

3. Apparatus for scanning a subject copy comprising means for guiding the copy along a predetermined path, a light sensitive device, an optical system for focusing light from the copy on the device along a light path, a rotor associated with said light path, a series of mirrors uniformly distributed about the axis of the rotor to cross said light path successively, the mirrors being positioned to scan through an angle over the same transverse line of the copy when the copy is stationary, means for advancing the copy along said path in synchronism with said rotor so that successive mirrors scan successive juxtaposed transverse lines of the copy, and means having an aperture in front of said device in said light path, the ratio of the minimum distance between the mirrors and the aperture to the distance between the aperture and the axis being a substantially constant function of said scanning angle.

References Cited in the file of this patent
UNITED STATES PATENTS

| 1,787,920 | Watson | Jan. 6, 1931 |
| 2,010,411 | Papst | Aug. 6, 1935 |
| 2,070,460 | Traub | Feb. 9, 1937 |
| 2,089,588 | Mihaly | Aug. 10, 1937 |
| 2,099,872 | Stern | Nov. 23, 1937 |
| 2,166,313 | Maguire | July 18, 1939 |
| 2,176,680 | Nichols | Oct. 17, 1939 |
| 2,254,614 | Mattke | Sept. 2, 1941 |
| 2,258,124 | Nichols | Oct. 7, 1941 |
| 2,262,584 | Herriott | Nov. 11, 1941 |
| 2,312,542 | Goodman | Mar. 2, 1943 |
| 2,491,758 | Nichols et al. | Dec. 20, 1949 |